US009767135B2

(12) United States Patent
Todd

(10) Patent No.: US 9,767,135 B2
(45) Date of Patent: Sep. 19, 2017

(54) DATA PROCESSING SYSTEM AND METHOD OF HANDLING REQUESTS

(75) Inventor: Stephen James Todd, Winchester (GB)

(73) Assignee: International Business Machines Corporation, Armonk, NY (US)

(*) Notice: Subject to any disclaimer, the term of this patent is extended or adjusted under 35 U.S.C. 154(b) by 732 days.

(21) Appl. No.: 12/443,830

(22) PCT Filed: Sep. 13, 2007

(86) PCT No.: PCT/EP2007/059651
§ 371 (c)(1),
(2), (4) Date: Jun. 4, 2009

(87) PCT Pub. No.: WO2008/040621
PCT Pub. Date: Apr. 10, 2008

(65) Prior Publication Data
US 2009/0300018 A1     Dec. 3, 2009

(30) Foreign Application Priority Data
Oct. 5, 2006  (GB) .................................. 0619644.8

(51) Int. Cl.
*G06F 7/00*       (2006.01)
*G06F 17/30*      (2006.01)
(52) U.S. Cl.
CPC .. *G06F 17/30362* (2013.01); *G06F 17/30345* (2013.01)
(58) Field of Classification Search
CPC ...... G06F 17/30362; G06F 9/46; G06F 9/546; G06F 17/30345; G06F 17/30348;
(Continued)

(56) References Cited

U.S. PATENT DOCUMENTS 5,335,325 A * 8/1994 Frank .................. G06F 9/30003
                                                711/163
5,561,793 A * 10/1996 Bennett ............. G06F 17/30171
(Continued)

OTHER PUBLICATIONS

Narasimhan, P.; Moser, L. E.; Melliar-Smith, P. M.; "Enforcing Determinism for the Consistent Replication of Multithreaded CORBA Applications"; Proceedings of the 18th Symposium on Reliable Distributed Systems; Lausanne Switzerland; Oct. 19-22, 1999.
(Continued)

*Primary Examiner* — Daniel Kuddus
(74) *Attorney, Agent, or Firm* — Steven M. Greenberg, Esq.; CRGO Law

(57) ABSTRACT

In a method of the invention, a plurality of distributed service requestors input service requests, and the service requests are replicated to at least two of a plurality of request processing components that are located within a communication path between the requestors and the data store. The method also includes preventing any request processing component that has not successfully claimed the service request from processing the service request A first request processing component can claim responsibility for the service request; and the first request processing component can process its replica of the claimed service request, including accessing data within the data store. The method also includes preventing any of the plurality of request processing components from entering a duplicate claim to responsibility for the service request.

16 Claims, 9 Drawing Sheets

(58) Field of Classification Search
CPC ......... G06F 17/30365; G06F 17/30377; G06F 17/300038; G06F 17/30575; G06F 17/30578; G06F 17/30581
See application file for complete search history.

(56) References Cited

U.S. PATENT DOCUMENTS

| | | | | |
|---|---|---|---|---|
| 5,613,139 | A * | 3/1997 | Brady | G06F 9/52 710/18 |
| 5,615,537 | A * | 4/1997 | Vollenweider | B65B 25/14 53/206 |
| 5,748,468 | A * | 5/1998 | Notenboom | G06F 9/3877 326/37 |
| 5,991,776 | A * | 11/1999 | Bennett | G06F 17/30171 |
| 6,058,389 | A | 5/2000 | Chandra | G06F 17/30321 |
| 6,246,056 | B1 * | 6/2001 | Koyama | B64G 1/365 250/203.6 |
| 6,247,056 | B1 * | 6/2001 | Chou | G06F 9/4843 707/999.01 |
| 6,594,651 | B2 * | 7/2003 | Kabra | G06F 17/30445 |
| 7,305,582 | B1 * | 12/2007 | Moser | G06F 9/526 714/11 |
| 7,523,130 | B1 * | 4/2009 | Meadway | G06F 17/30575 |
| 7,792,342 | B2 * | 9/2010 | Barbu | A61B 6/12 382/128 |
| 7,797,342 | B2 * | 9/2010 | Banks | G06F 17/30595 707/783 |
| 2003/0074360 | A1 * | 4/2003 | Chen et al. | 707/100 |
| 2004/0117794 | A1 | 6/2004 | Kundu | |
| 2004/0205372 | A1 * | 10/2004 | Moser | G06F 11/1683 714/1 |
| 2004/0225546 | A1 * | 11/2004 | Oberdorfer | G06F 11/3006 705/7.27 |
| 2005/0034014 | A1 * | 2/2005 | Moser | G06F 9/485 714/17 |
| 2005/0278572 | A1 * | 12/2005 | Busaba et al. | 714/27 |
| 2006/0123121 | A1 | 6/2006 | Maegawa et al. | |
| 2008/0033960 | A1 * | 2/2008 | Banks | G06F 17/30595 |
| 2009/0182767 | A1 * | 7/2009 | Meadway | G06F 17/30575 |

OTHER PUBLICATIONS

Fang, C. L .; Liang, D.; Chen, C.; Lin, P.; "A Redundant Nested Invocation Suppression Mechanism for Active Replication Fault-Tolerant Web Service"; Proceedings of the 2004 IEEE International Conference on e-Technology, e-Commerce and e-Service; Taipei, Taiwan; Mar. 28-31, 2004.

Felber, et al., "Experiences, Strategies, and Challenges in Building Fault Tolerant CORBA Systems," IEEE Transactions on Comp., Calif, May 2004, vol. 53, No. 5 ,pp. 497-511.

* cited by examiner

FIG. 9

Table 1

|  | (A) Queue within HA system | | (B) Queue outside HA system | | (C) Embodiment of invention | |
| --- | --- | --- | --- | --- | --- | --- |
|  | nonHA | HA | nonHA | HA | nonHA | HA |
| insert | 0 | 1 + data probably coordinated with a nonHADB resource | 1 + data probably coordinated with other nonHADB resource | 0 | 2 + data, probably coordinated with other nonHADB resource | 0 |
| Process and remove message | 0 | 1 probably coordinated with other HADB data | 1 probably coordinated with HADB data | 0 | 2 | 1 probably coordinated with other HADB data |
|  |  |  | Delayed orphans – does not achieve assured timely process |  |  |  |

DATA PROCESSING SYSTEM AND METHOD OF HANDLING REQUESTS

CROSS-REFERENCE TO RELATED APPLICATIONS

This application is a Submission Under 35 U.S.C. §371 for U.S. National Stage Patent Application of International Application Number PCT/EP2007/059651, filed 13 Sep. 2007 and entitled DATA PROCESSING SYSTEM AND METHOD OF HANDLING REQUESTS, which is related to and claims priority to European Patent Application Serial Number EP0619644.8 filed 5 Oct. 2006 the entirety of which are incorporated herein by reference.

FIELD OF INVENTION

The present invention has applications in distributed data processing environments such as database systems and messaging systems. The invention has particular application in data processing systems that update a high availability data store in response to requests from multiple requesters.

BACKGROUND

Increasingly, business applications such as ordering systems that are implemented using computer hardware and computer software are required to have high availability and reliability. Many businesses demand that their data processing systems are operational 24 hours of every day and never lose data, and the best information technology companies have responded to those demands (in some cases achieving availability of data processing systems above 99.99%). Businesses typically also want high performance (high throughput without loss of reliability), which requires scalable solutions as data processing requirements increase, and they do not want high costs.

Highly available data processing systems have been developed using a combination of redundancy (of storage, processors and network connections) and recovery features (backup and failover) to avoid any single point of failure. One such solution includes a high availability database (HADB) that is distributed across a tightly integrated cluster of servers using redundant storage arrangements, such as a cluster of highly reliable IBM mainframe computers that act together as a single system image. Clusters of processors that combine data sharing with parallel processing to achieve high performance and high availability are sometimes referred to as a parallel systems complex or 'parallel sysplex'. A typical HADB implemented in a parallel sysplex can handle multiple parallel requests for data retrieval and data updates from a large number of distributed requesters with high performance and reliability.

The HADB system can include a robust, high availability message processing system that combines message queues with business logic and routing functions to manage data access. This can provide assured once-only message delivery, and such systems can handle failures efficiently with reduced delays. However, the transaction management, redundancy management and recovery features that are typically implemented within such a high availability system incur significant processing overheads during normal request processing. Any such processing has potential business costs—because high availability data processing systems are more expensive than less reliable systems. An example of this additional processing is a requirement for two phase commit processing within the HADB system or, more particularly, two phase commit processing between resources within the HADB system and resources outside the system. Also, implementing message queues within the HADB system typically requires logging of the message data within the HADB.

An alternative solution is to employ a cluster of parallel message dispatchers that are separate from the HADB system, such as in a conventional application server cluster in which each server does not implement comprehensive high availability features. Parallel processing can improve throughput and reduce the impact of failures compared with a single message dispatcher, and separating the message dispatcher functions from the HADB system can reduce processing overheads. However, if the message dispatchers run on servers without high availability features, a failure which affects one server will delay the processing of the messages that have been sent to that server. This can be problematic despite the possibility of other messages being successfully processed by other message dispatchers in the meantime. The messages sent to a failed message dispatcher (referred to herein as 'orphan messages' or 'orphan requests') are typically delayed until that message dispatcher comes back on-line.

Some known clustered messaging systems implement a number of features for fast recovery following a node failure, to reduce delays in the processing of orphan messages, but such approaches have not as yet fully solved the problem of delayed processing of orphan messages.

SUMMARY

A first aspect of the present invention provides a method for managing service requests, for use in a data processing environment that includes a data store and at least one service requestor, the method comprising the steps of:

replicating a requestor's service request to at least two of a plurality of request processing components, the plurality of request processing components each being located within a communication path between the requestor and the data store;

preventing processing of the service request by any request processing component that has not successfully claimed responsibility for the service request;

a first request processing component claiming responsibility for the service request; and the first request processing component processing its replica of the claimed service request, including accessing data within the data store.

In one embodiment, the step of claiming responsibility comprises entering an identifier for the service request in a repository in the data store, and the method further comprises preventing any of the plurality of request processing components from entering a duplicate identifier for the service request in the repository.

In one embodiment, the step of preventing processing of the service request comprises preventing execution of request processing logic. In an alternative embodiment, the step of preventing processing of the service request comprises preventing updating of data within the data store (i.e. some processing of requests may be possible, including executing some business logic and possibly reading data from the data store, but writing of data updates is prevented)

In one embodiment of the invention, the data processing environment comprises a plurality of distributed service requesters and the data store comprises a database running on a high availability data processing system.

In one embodiment, the request processing components comprise business logic for processing a received request, to determine what data access operations are required within the data store, and request dispatcher functions for handling asynchronous delivery of a replica of the request from the service requester to the data store.

A second aspect of the invention provides a data processing system comprising:

a data store;

a plurality of request processing components, wherein each of the plurality of request processing components is located within a communication path between at least one service requestor and the data store; and a replicator for replicating a service requestor's service request to at least two of the plurality of request processing components;

a claims manager comprising: functions for preventing any request processing component that has not successfully claimed responsibility for the service request from processing the service request; and functions for claiming responsibility for the service request on behalf of the first request processing component, thereby to enable the first processing component to process a replica of the service request.

The functions for claiming responsibility may comprise entering an identifier of the service request in a repository within the data store, and the claims manager may further comprise functions for preventing any of the plurality of request processing components from entering a duplicate service request identifier within the repository.

One embodiment of the present invention mitigates one or more problems of existing high availability server environments, by providing multiple request processing components (request dispatchers and associated business logic) and replicating requests to two or more request processing components, and then managing the processing of requests within a high availability system to ensure that only one replica of a particular request can update a high availability data store.

By providing a number of request processing components that work in parallel with each other, and replicating each request across the parallel request processing components, it is possible to reduce the problem of delayed orphan requests. If one replica request is significantly delayed, another replica request should succeed. Implementing these request processing components outside a high availability system allows this mitigation of the problem of orphan requests to be implemented without imposing a high processing overhead on the high availability system, whereas managing once-only data updates within the high availability system maintains data integrity. In one embodiment of the invention, request messages are enqueued and business logic processing of messages is performed outside of the high availability system, whereas consequential HADB updates and definitive removal of request messages from the queues are handled under transactional scope by the high availability system. Particular embodiments of the invention provide efficient mechanisms for managing once-only updates within a HADB system.

The invention differs from conventional parallel processing, in which any message is assigned to only one of a set of components arranged in parallel, because in the present invention a request or message is replicated across two or more of the set of parallel request processing components.

Another aspect of the invention provides a message queuing system which uses replication to achieve reliability for the operation of inserting a message onto a queue and relatively high availability for enqueued messages, but communicates with a single high availability database (HADB) system and uses transaction processing and locking mechanisms for assured once only updating of the HADB. The operation of definitively removing a message from the queue following processing of the message (and any required updating of the HADB) is controlled by data held within the HADB system.

In a traditional queuing system, the action of inserting a message onto a queue (e.g. in response to a PUT_message command), the storage of the message on the queue, and the action of retrieving the message (e.g. in response to a GET_message command) are all implemented within the same system and hence use the same reliability mechanisms. A message queuing system according to the present invention is differentiated from such traditional systems by using replication at one end of the queue (which enables reliability to be achieved despite use of inexpensive components) while making use of the capabilities of a single high availability system at the other end of the queue to ensure data integrity and availability at that end of the queue. This has considerable advantages when the application programs that may be inserting messages are already operating in an environment which relies on inexpensive and relatively unreliable components, whereas the messages are intended to update resources in a high availability system.

In one embodiment, once-only processing of each request's HADB updates is achieved by saving, within a repository of the HADB, request identifiers for requests that are processed in the HADB; and by checking the repository of request identifiers before any replicated request can update the HADB. Entries in the repository of request identifiers can be locked (using conventional HADB locking capabilities) while a request is being processed, with a commit of this processing being managed in the high availability system. Subsequent recognition of the request identifier ensures deletion of all replicas of that request. Locking entries in the repository of request identifiers, and avoiding duplicate entries, ensures that multiple replicas of the same request cannot update the HADB multiple times.

In one embodiment of the invention, the repository of request identifiers is a database table in which a row of the table corresponds to a request. This table is referred to hereafter as the 'claims table'. A first request processing component inserts a request identifier into the claims table and obtains a lock on the claims table row, and obtains another lock on the part of the HADB that is holding the relevant data items. The locks are implemented by conventional HADB mechanisms and are maintained until the processing of the particular request is complete, when any HADB updates required by this request are committed and any replicas of the request are deleted.

One embodiment of the invention implements once-only processing of messages without wasting HADB transactions, by allowing a single HADB transaction to encompass one or more failed attempts to insert a request identifier within the claims table, as well as encompassing the eventual successful insertion of a request identifier and the corresponding request processing by the message dispatcher and business logic (including an HADB update in the case of 'write' requests).

Another embodiment of the invention provides a computer program comprising a set of instructions for controlling a data processing apparatus to perform a method as described above. The computer program may be made available as a computer program product comprising program code recorded on a recording medium, or may be available for transfer via a data transfer medium such as for download via the Internet.

BRIEF DESCRIPTION OF DRAWINGS

Embodiments of the invention are described below in more detail, by way of example, with reference to the accompanying drawings in which:

FIG. 9 represents relative processing overheads for various alternative approaches to handling service requests.

DESCRIPTION OF EMBODIMENTS

The present invention has particular advantages for high availability data processing environments, where it is necessary to be able to access a data store and to apply updates to the data store with minimal delays and minimal impact from failures.

As is known in the art, high availability may be achieved in a variety of ways. A first known solution employs complex hardware that includes many redundant components, and specialized additional components to arrange failover between the redundant components. These redundant components may include processors, memory, controllers, hard drives and communication buses. Such complex hardware is complemented by appropriate computer software. An example of such a high availability system is an IBM zSeries data processing system running IBM's DB2 database system software and IBM's z/OS operating system. IBM, zSeries, z/OS and DB2 are trademarks of International Business Machines Corporation.

A second known solution provides many simple systems, each prone to failure but relatively inexpensive, with a relatively simple software mechanism to share work between them and to avoid failed systems. Each instance of the software running on such systems is also typically less resilient than in a high availability system, relying on the multiplicity to ensure that there are always sufficient systems operating at any one time. This second solution is generally used for high volume processing and stateless logic, but is more difficult to use for stateful information, because of the problems of deciding which is the definitive instance of data when there are multiple copies.

Figure 1:
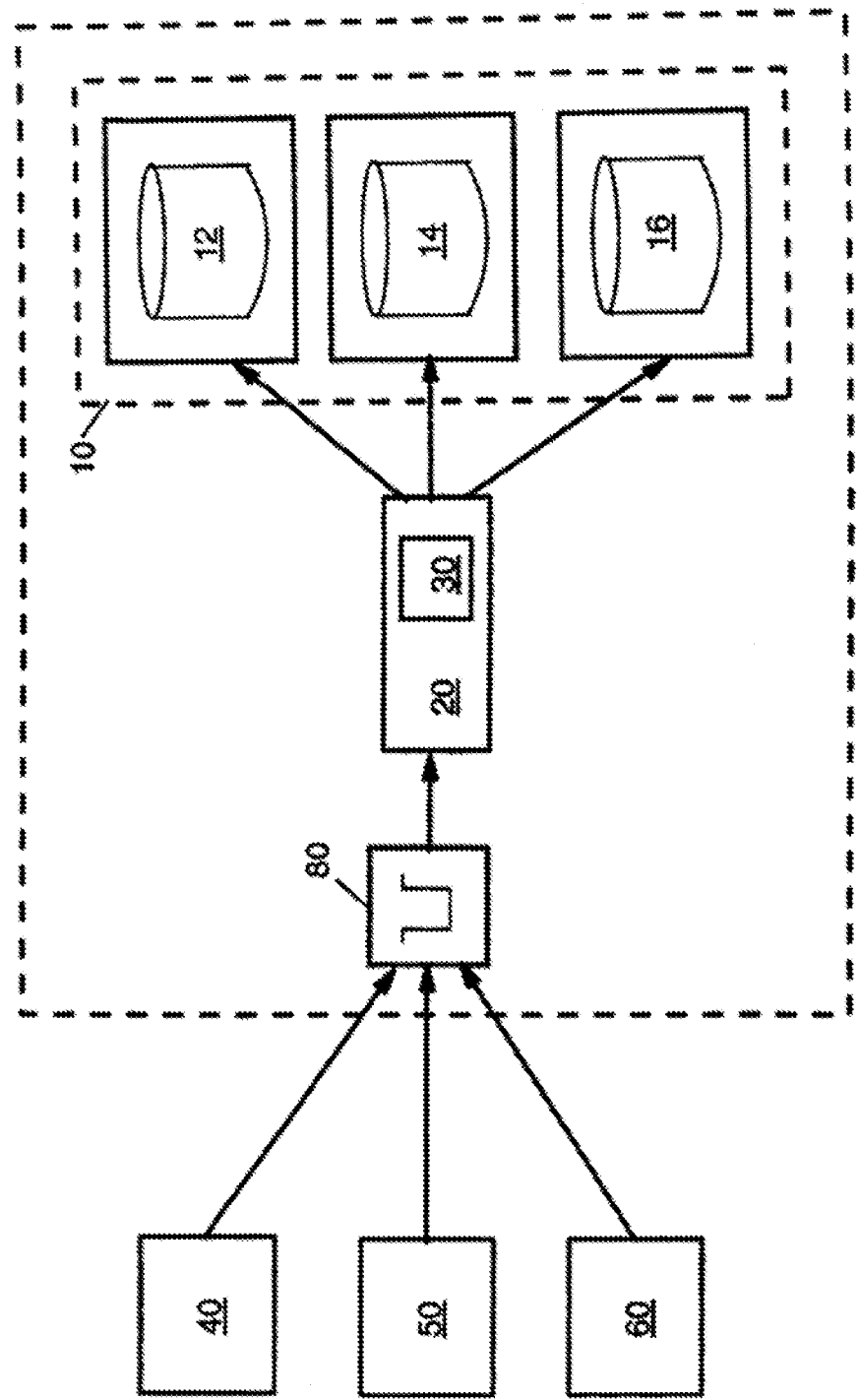
FIG. 1 is a schematic representation of a data processing system in which a single messaging system processes request messages and sends update instructions to a database, such as is known in the art.

Referring again to the first known solution as described above, FIG. 1 is a schematic representation of a distributed data processing system in which a high availability data store (HADB) 10 is associated with a messaging system comprising a queue 80, a message dispatcher 20 used to dispatch data access operations that result from execution of business logic 30. The business logic 30 has responsibility for determining what update is required to the HADB and then cooperates with the HADB to manage the update, and to coordinate the update with the removal of the message from the queue. By way of example, the data store 10 is shown in FIG. 1 distributed across three or more servers 12, 14, 16 that each have their own data processing and data storage capability. A plurality of requestors 40,50,60 submit requests for data access via the message dispatcher 20.

To achieve high availability for the system as a whole, the messaging system 20 and its business logic 30 may be integrated within the high availability server that holds the HADB. As noted above, the HADB may be a DB2 database from IBM Corporation and the server may be an IBM zSeries computer system running the z/OS operating system, which includes redundant processors and storage and failover recovery features to provide maximum reliability and availability. Although this reliability and availability are desirable, and are critical requirements for some applications, the message dispatcher and business logic nevertheless impose an undesirable processing overhead on the high availability server. For example, assurance of once-only updates to the HADB typically involves two-phase commit processing to protect against failures between an HADB update and definitive deletion of the corresponding request message. In particular, the insert of messages by requesters 40,50,60 into the queue may require coordination between the message store and other resources used by the requestors. This coordination imposes significant overhead for a highly available message store. The present invention mitigates this problem.

Alternatively, message dispatcher and business logic functions may be implemented within a standard application server running on hardware that does not have high availability features. Such application servers are well known in the art, and products such as WebSphere Application Server from IBM Corporation can be run on relatively inexpensive computer systems that do not provide comprehensive support for high availability. WebSphere is a trademark of International Business Machines Corporation.

It is also known to mix the different processing styles described above, running some data processing systems on low cost duplicated hardware but accessing a robust high availability database (HADB) for long term data storage. The approach of separating the business logic and message dispatcher functions from the HADB system has a lower impact on the high availability server that is running the HADB, at least during normal forward processing. However, running the business logic and message dispatcher on a standard application server and low cost hardware increases the risk of delay for 'orphan requests'. That is, a request that is sent to a failed application server is delayed until the application server is back on-line.

The present invention mitigates this problem. In a first embodiment, as described in detail below, a plurality of distributed service requesters can input service requests to a request processing system. The request processing system includes a plurality of inexpensive request processing components communicating with a high availability data store. The service requests are replicated to at least two of the plurality of request processing components. Any request processing component that has not successfully claimed responsibility for the service request is prevented from processing the service request, to avoid duplication of updates to the data store. A first request processing component claims responsibility for the service request, and then processes its replica of the claimed service request—including accessing data within the data store. All of the plurality of request processing components are prevented from entering a duplicate claim to responsibility for the service request, and this assured once-only claiming of responsibility for a service request prevents duplication of updates to the data store.

Figure 2:
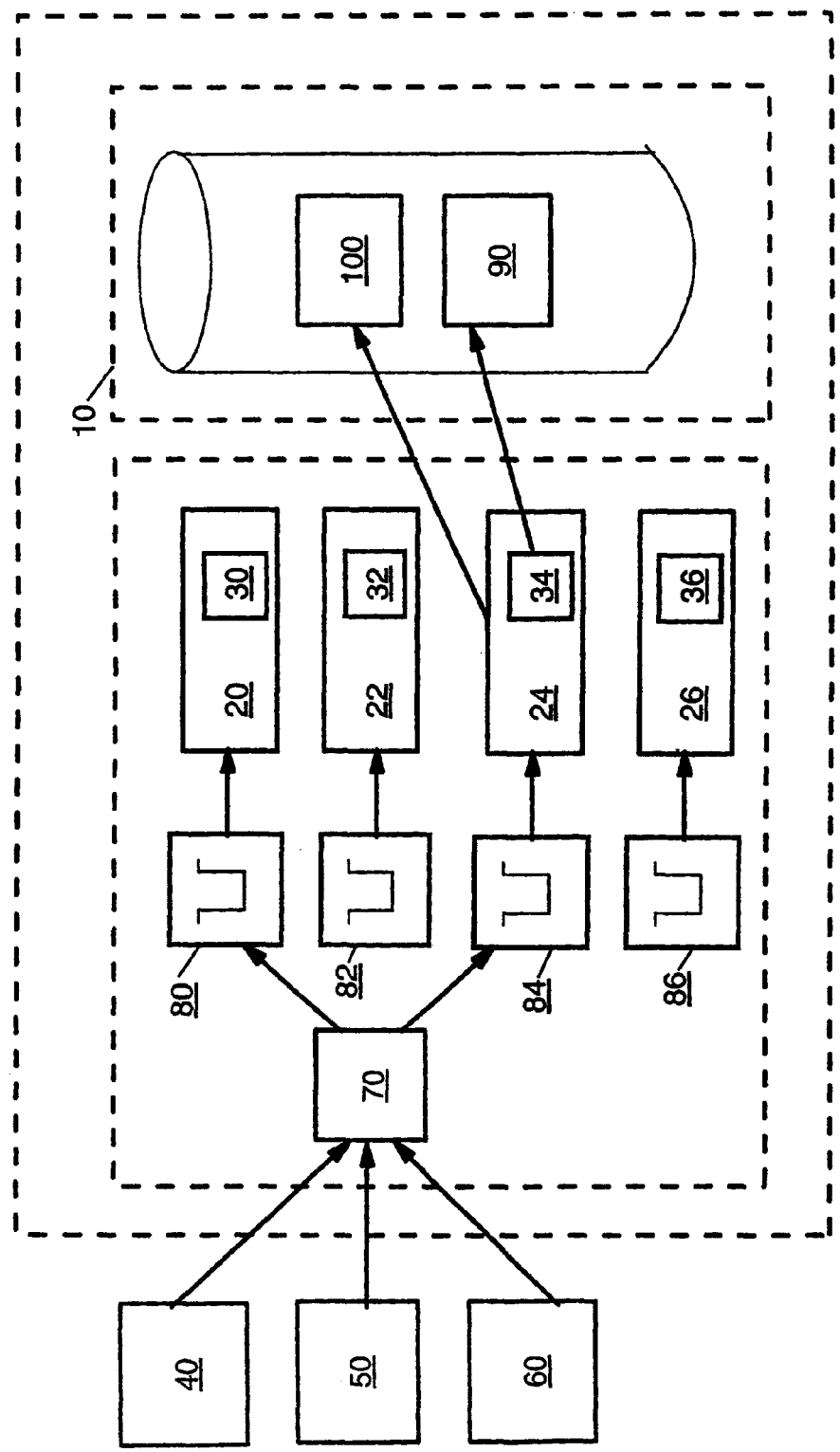
FIG. 2 is a schematic representation of a distributed data processing system according to an embodiment of the invention.

FIG. 2 shows a distributed data processing system according to an embodiment of the present invention. As in FIG. 1, a number of distributed parallel requestors 40, 50, 60 are requesting a service, and the business logic of the service requires data access from a HADB. However, in the solution of FIG. 2 the requests are replicated across two or more of a plurality of related queues 80,82,84,86 that are associated with a plurality of message dispatchers 20,22,24,26 arranged in parallel. Where the requestors of FIG. 1 place messages in the input queue of a single message dispatcher 20, in FIG. 2 the messages are enqueued for distribution via a replicator 70. The replicator 70 fulfils the limited role of replicating messages to a chosen subset, k, of the set of N parallel message dispatchers, where 1<k=N. In a particular implementation, k is 2; in another implementation, k is 3.

As shown in FIG. 2, the replicator 70 may be a receiving component to which all requests are sent by the requestors 40,50,60. In another embodiment (described later with reference to FIG. 3), the replicator function may be implemented at the requestor's system or at an intermediate proxy server elsewhere in the network.

According to the embodiment of FIG. 2, the distribution of requests by the replicator 70 is a k-way fan out distribution that places each message in at least two message queues (80,84); but see the description below relating to exceptions. In the embodiment as illustrated, we have each message dispatcher associated with a single queue—for example, message dispatcher 20 is associated with queue 80. Alternative embodiments permit a more complex association between queues and message dispatchers. The selection of the particular k queues by the replicator may be as simple as a round-robin allocation from within the set N, but other selections using workload balancing techniques may be implemented.

In one embodiment of the invention, the number k (as well as the choice of which particular k queues) is determined on a per-message basis, selecting a higher value of k for relatively high value and urgent messages and a lower value of k for low value messages. A particular embodiment provides for exceptions to the replication of messages, allowing selection of a single message dispatcher (k=1) for identifiably low value or non-urgent messages. Thus these messages will be processed as in the prior art, and will not benefit from the invention, but will not prevent the application of the invention to other messages.

Figure 3:
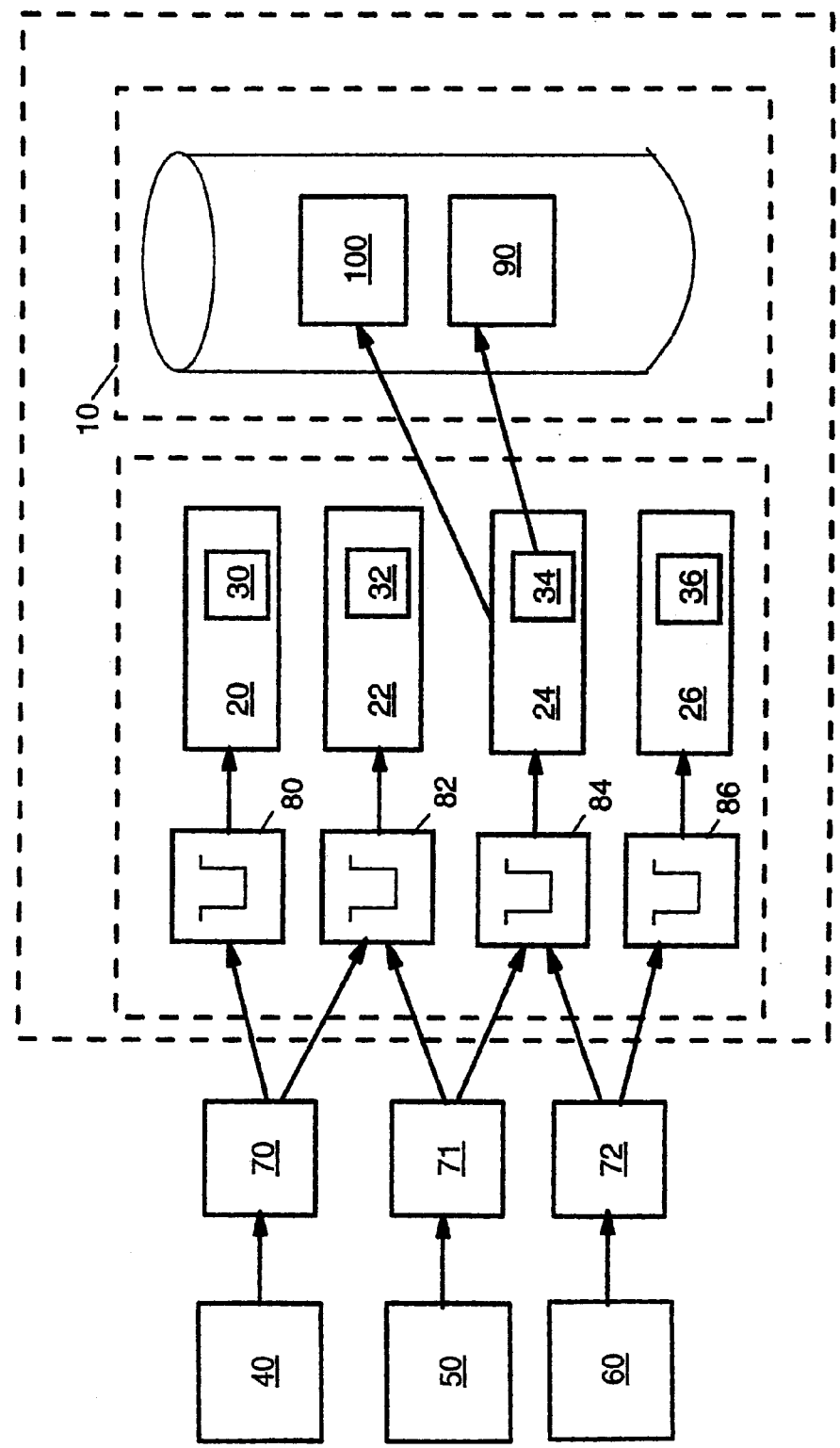
FIG. 3 provides a schematic representation of a distributed data processing system according to another embodiment of the invention.

Referring briefly to FIG. 3, this differs from FIG. 2 by the different implementation of the distributed replication function. Each requestor makes use of the services of a respective replicator 70,71,72, which may be local to and dedicated to the individual requester 40,50,60 or may be located at some intermediate location within a distributed network. For each replicator, the number k of queues to send replica requests to, and the selection of a particular set of k queues, may be determined dynamically or may be predefined as implied by FIG. 3.

In the embodiments of both FIGS. 2 and 3, the message dispatchers (20,22,24,26) each implement request dispatcher functions and business logic (30,32,34,36) that can apply updates to the HADB 10. In a first embodiment, the HADB is viewed by the message dispatchers as a single system and any HADB-internal segmentation for efficiency or availability is invisible to the requestors and message dispatchers. In such a system, the message dispatcher is responsible for retrieving a message from its input queue and invoking the business logic, and for requesting insertion of an entry in a claims table, but routing within the HADB is not the responsibility of the message dispatchers. As noted above and described in more detail below, the 'claims table' is a repository of service request identifiers, identifying those service requests for which a request processing component has claimed responsibility. Solutions in which a HADB structure is invisible to external requesters, and HADB-internal features are responsible for identifying a required HADB segment, are well known in the art. The business logic is typically application-specific, for example processing an order for goods or services and generating a specific update instruction to apply to the HADB to reflect that order. Because of the replication of messages to more than one dispatcher, the message dispatchers (20,22,24,26) and their input queues (80,82,84,86) are not required to implement high availability features, as explained below.

The HADB 10 includes, in addition to the HADB business data 90, a claims table 100. The claims table 100 is a database table that has a single key column for containing a request identifier (such as a message identifier, or another request identifier). Only one of the message dispatchers is allowed to insert an entry into the claims table for any particular request identifier. A claims manager 110 is associated with the claims table 100, and is responsible for checking the claims table before the table can be updated. In the current embodiment of the invention, the functions of the replicator 70, message dispatcher 20, business logic 30 and claims manager 110 are implemented in software, although their logical operations could be implemented in hardware such as using electronic circuitry.

The claims table may also contain additional information such as the time of a successful claim to responsibility for a service request, and the identity of the claimant. This is not essential to the operation of the invention, but may provide valuable diagnostic and statistical information about system behaviour.

In practice, the operation of the claims manager is likely to be partitioned between claims manager specific code executing in the distributed processor of the message dispatcher, and generic database locking code operating within the HADB. This is shown in more detail later.

In one embodiment, the message dispatcher functions and business logic are implemented within Message-Driven Beans, which are Enterprise JavaBeans (EJBs) implementing the Java Messaging Service (JMS), allowing J2EE applications to asynchronously process JMS messages. In this embodiment, the application servers running the message dispatchers are J2EE application servers that receive JMS messages from many distributed requesters (J2EE application clients or other JMS applications or systems). A single Message-Driven Bean can process messages from multiple clients. The logic of the claim manager 110 can be implemented as a function of the EJB container that calls methods of the Message-Driven Beans. When a message arrives, the container first calls the claim manager logic 110 to ensure that the message is not a replica of a message that has already been processed. The container then calls a method of the Message-Driven Bean, which identifies the particular JMS message type and handles the message according to the application-specific business logic (as in standard J2EE solutions). This application-specific business logic processes the information within the message to generate a specific database update instruction which is then sent to the HADB. Java and Java-based trademarks are a trademark of Sun Microsystems, Inc.

In an alternative embodiment, the dispatching of messages is implemented by a conventional messaging program performing a message GET operation. In this case, the claims manager 110 becomes part of the messaging system, and the claims table 100 is an HADB extension to the message store, but the rest of the message store may be implemented using a different technology.

Figure 5:
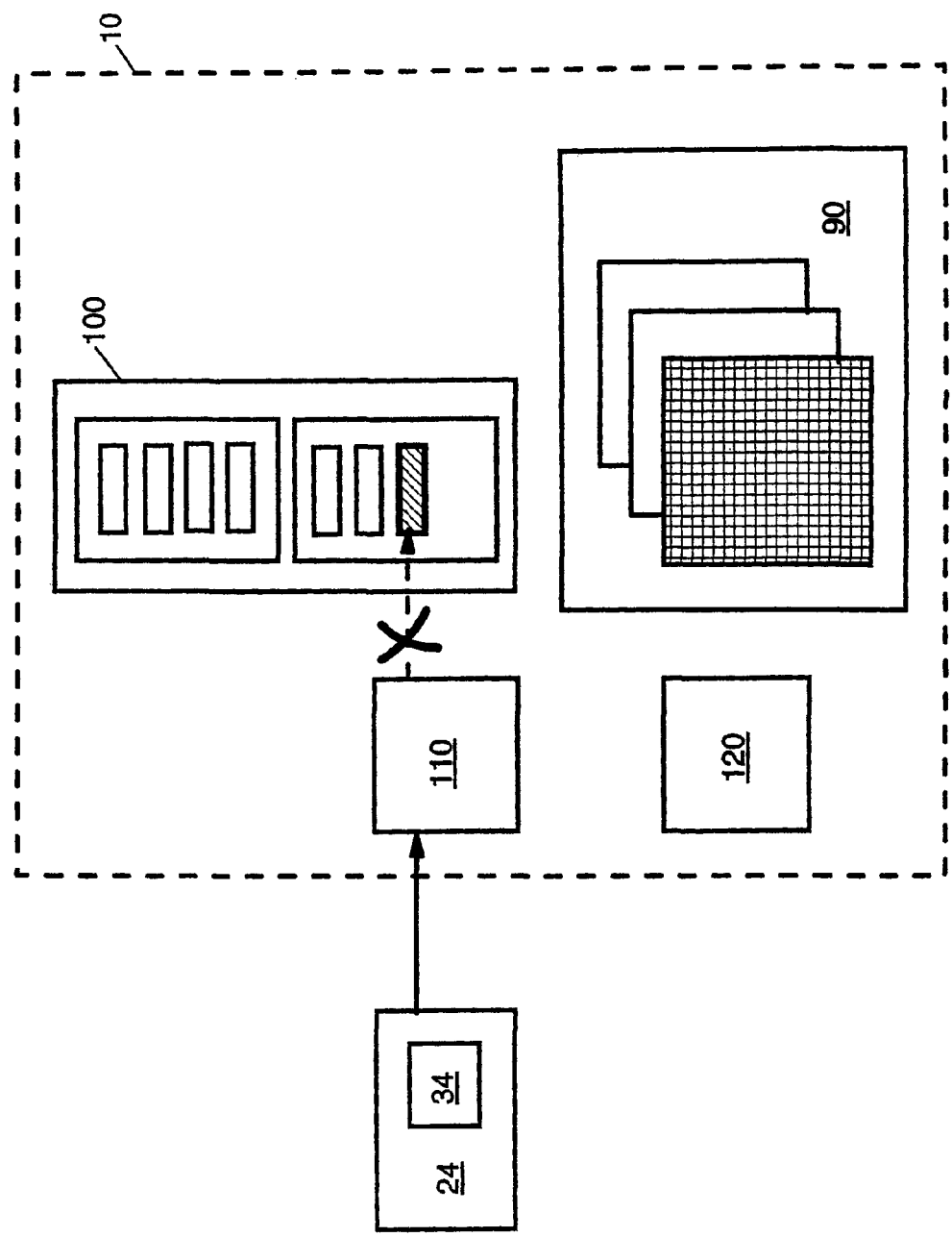
FIG. 5 is a schematic representation of a request dispatcher attempting to update a claims table and being rejected.
Figure 6:
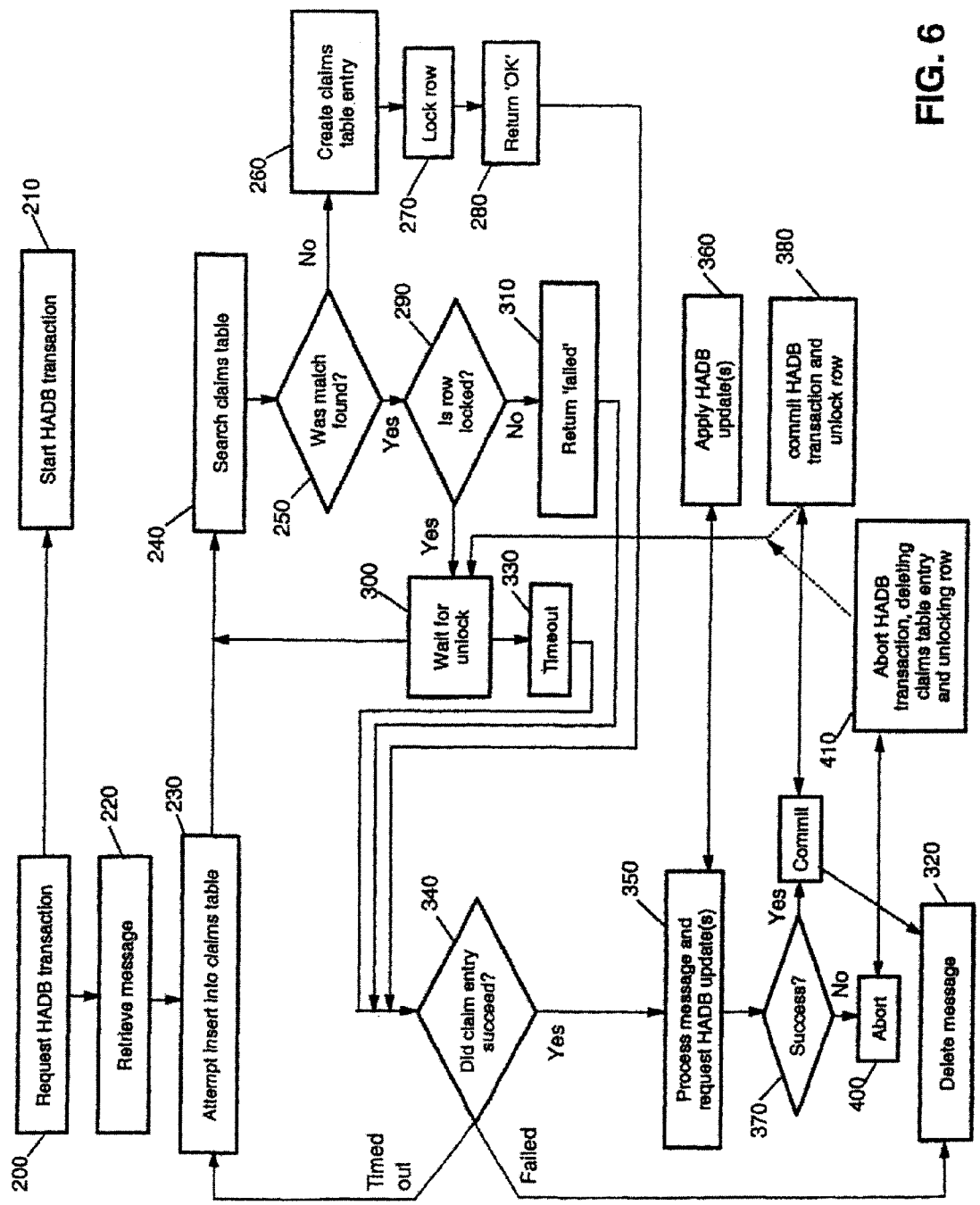
FIG. 6 is a schematic flow diagram representation of a method according to an embodiment of the invention.
Figure 7:
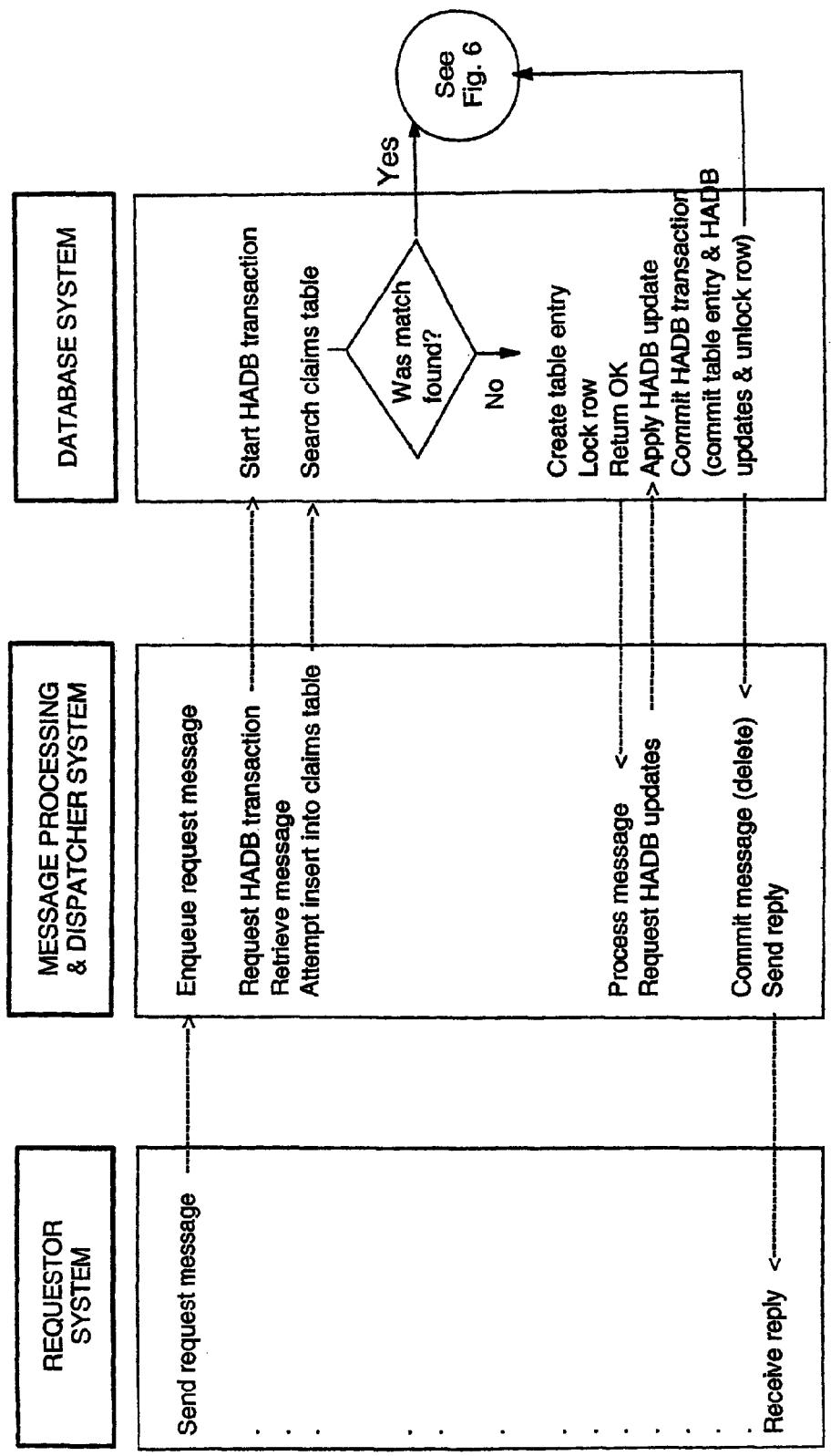
FIG. 7 shows a sequence of steps of a method according to an embodiment of the invention, in which a request message is successfully processed.
Figure 8:
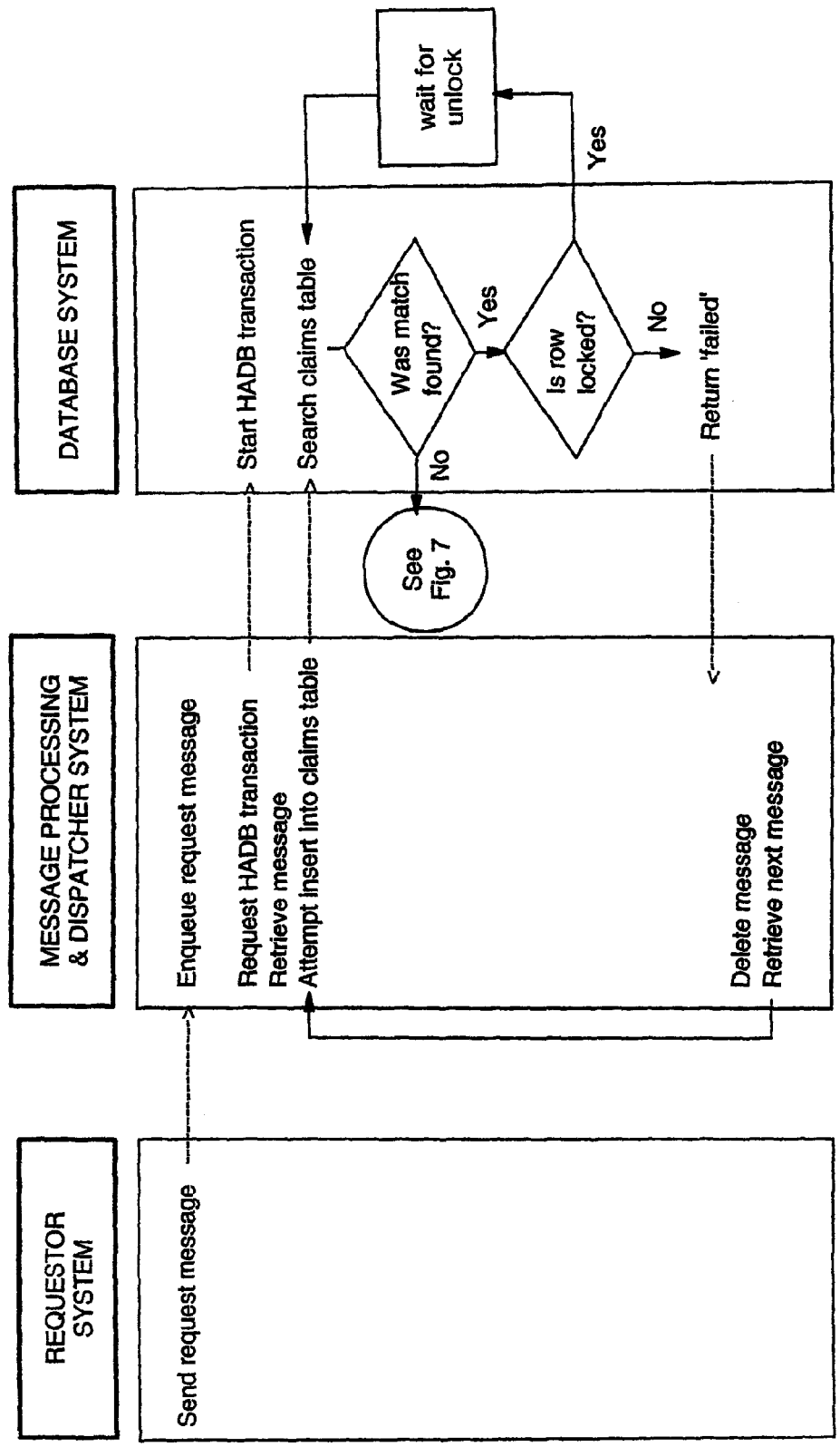
FIG. 8 shows a sequence of steps of a method in which a duplicate message is not permitted to update a database.

Any of a potentially large number of requestors 40,50,60 may request a service by sending a request message via a replicator 70. Each message is replicated and enqueued at a subset k of the available queues 80,84. Any of the associated k message dispatchers (20,24) may perform the following operations for a replica message. The operations are described with reference to FIGS. 4, 5, 6, 7 and 8. On receipt of a request message by one of the message dispatchers, an HADB transaction is started 210, and then the current message dispatcher 24 retrieves 220 a first message from its input queue 84. These steps are shown in FIGS. 6, 7 and 8. Updates to the business data and claims table of the HADB (described below) take place within the same HADB transaction, to ensure that both the claims table and business data are successfully updated or, if an update is unsuccessful, both are backed out.

Figure 4:
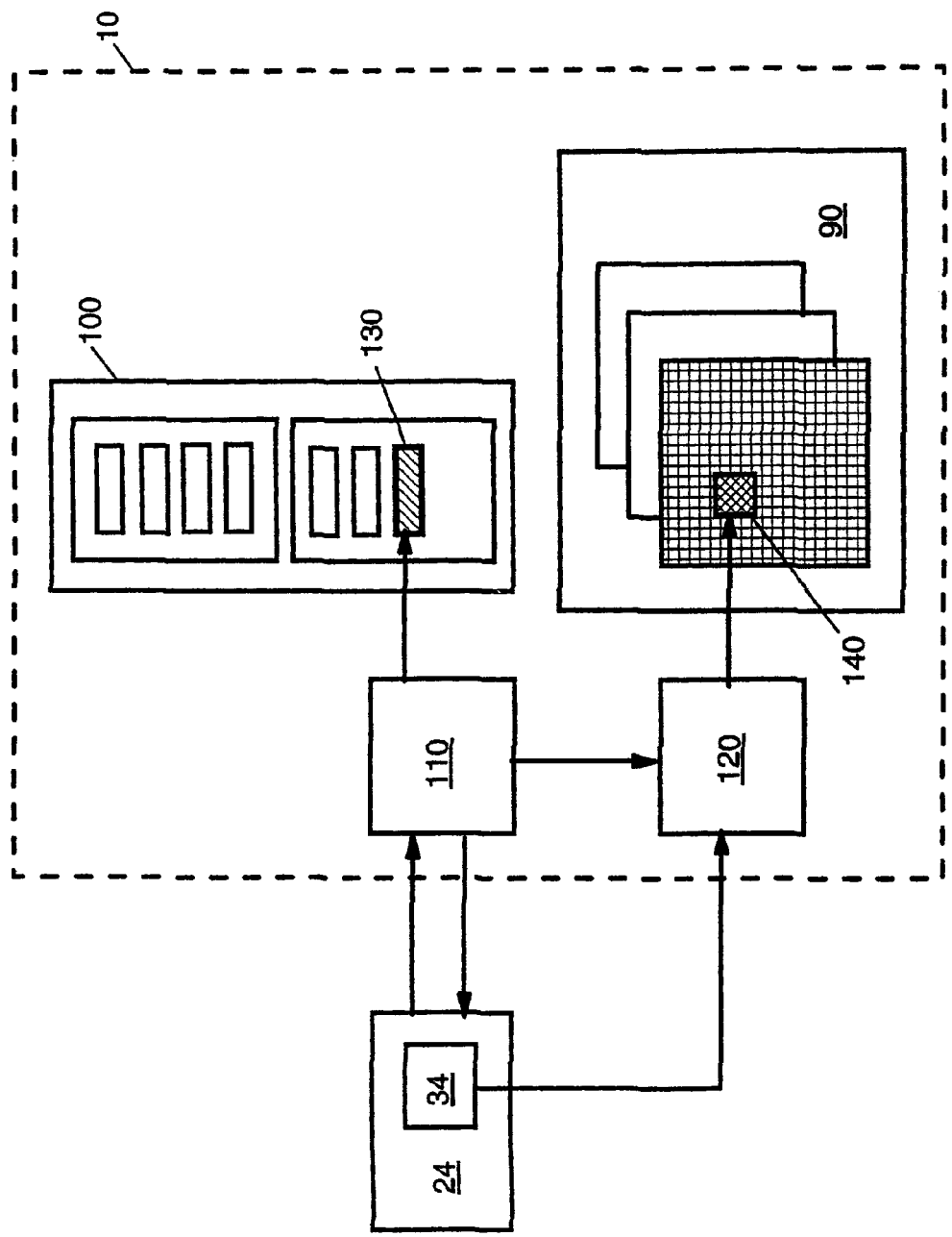
FIG. 4 is a schematic representation of a request dispatcher updating a claims table, according to an embodiment of the invention.

The message dispatcher 24 attempts 230 to insert a claim 130 to this message in the claims table 100 of the HADB 10, in particular attempting to insert the unique request identifier as a new row in the claims table. Before a claim is inserted, a scan of the request identifiers is performed 240 (a logical scan corresponding to scanning all of the rows of the claims table, but performed against an index of the claims table to avoid the need for a full physical scan of the table). This scan identifies any matching request identifier. As shown in FIGS. 5, 6 and 8, the attempted claim does not succeed at this time if another message dispatcher is determined 250 to have already entered this request identifier in the claims table; but the claim succeeds if there is no matching entry in the claims table, as shown in FIGS. 4, 6 and 7. On successful entry 260 of a claim in the claims table 100, the HADB locks 270 this row of the claims table to prevent changes by other message dispatchers 20,22,26.

A copy of the retrieved message remains in the message dispatcher's input queue 84, but the message status is implicitly changed by the action of updating the claims table, from a "received" status (i.e. the message is available on the queue and ready for retrieval) to a "retrieved but in doubt" status (i.e. the message has been retrieved from the queue for processing, but processing of the message is not yet committed).

Referring to FIGS. 4, 6 and 7, the first message dispatcher 24 (from a set of k dispatchers) that attempts to insert a new request identifier into the claims table 100 is successful. The claims table is extended by inserting 260 a new row 130 that contains the request identifier, and this first dispatcher obtains 270 a lock on that row of the claims table using standard HADB locking mechanisms. Specifically, the HADB implements locks on the claims table in response to requests from the claims manager 110, maintaining a record of which message dispatcher 24 is associated with a locked row. The row locks prevent modification by other message dispatchers 20,22,26 while the first message dispatcher's message is being processed (i.e. until commit or abort of an HADB transaction and message transaction—as described in more detail below).

A new entry to the claims table is only permitted by the claims manager 110 if the table currently contains no entry for the particular request identifier, so duplicate table entries are not possible. If the claims manager 110 finds 240,250 an entry in the claims table with a matching request identifier, as shown in FIGS. 5, 6 and 8, the claim entry obtained by the first message dispatcher 24 prevents changes being made on behalf of any other request dispatcher.

If the matching claims table row 130 is found 290 to be locked on behalf of the first message dispatcher 24, a different message dispatcher's request to insert a duplicate entry in the claims table is held in memory to await 300 unlocking of the row of the claims table that is holding the matching entry. The first message dispatcher's claims table entry 130 may be deleted or committed before being unlocked, depending on the outcome of the corresponding HADB transaction and message transaction, so it is not possible at this stage to predict whether a subsequent attempt to update the claims table will succeed or fail. This is why duplicate claims requests may be held in memory to enable a retry.

While a request to update the claims table is held in memory, the copy of the message on the input queue of the message dispatcher 20 now has implicit status "retrieved but in doubt". The HADB has not commenced processing this replica request's data update, but another replica of the same request is being processed and so the claim request for the current replica is held in memory to await the outcome of that processing. Thus, all replicas of a message for which an HADB update is attempted now have the same implicit status "retrieved but in doubt", while they remain uncommitted on their respective message dispatcher's input queue 80,82,84,86. There is no need for the message dispatchers 20,22,24,26 to write any explicit status information because the implicit status is easily determined from the claims table 100; if an attempt is made to retrieve and process a replica message the status is easily determined, and the status is unimportant until such retrieval and update are attempted.

Alternatively, if the matching claims table row has already been committed and unlocked, any subsequent attempts to insert a duplicate entry in the claims table must fail. In this case a failure report is returned 310 to the message dispatcher that is attempting to insert the duplicate entry in the claims table, and the message dispatcher deletes 320 the corresponding message from its input queue.

Row-specific locks are obtained on the claims table, rather than a less granular lock on the entire table or the page that contains a relevant claims table entry, because the replication of requests makes it likely that there will be frequent conflicting attempts to update the claims table. A more granular row lock will reduce the number of requests that must be held up compared with a less granular page lock, avoiding conflicts between different messages that would occur if page locks were implemented. Despite the likelihood of frequent conflicts at the claims table level, the handling of claims requests requires little processing within the high availability system and, in particular, can involve less of a performance cost than if all of the message dispatcher functions and business logic were implemented within the high availability system.

One embodiment of the invention also reduces conflicts between multiple replicas of the same message, by introducing a slight 'stagger' in the timing of replicas generated by the replicator 70. Typically, where all message dispatchers are operating at the same rate, the first released replica will be completely processed before an attempt is made to schedule the second replica. Where the first dispatcher is temporarily inoperable, the second replica will still be processed in a timely manner. There will be cases where there are simultaneous attempts to process both replicas, but the number of such cases will be reduced.

As noted above, the prevention of conflicting updates may involve the HADB temporarily storing a new request to update the claims table (i.e. a claim request may be held in a queue in memory) in response to identifying 240,250 a matching claims table entry. The claims request awaits 300 the outcome of a service request that is currently being processed (or a timeout 330 if this occurs earlier) and only then decides whether to accept or reject the new claim request. A claims request that is held in memory will remain until an 'unlocked' signal is received from the claims manager or until a timeout, whichever occurs first. A timeout may be followed by a repeated attempt to update the claims table on behalf of the timed-out message dispatcher, for example after a predefined delay period. An 'unlocked' signal prompts a repeated scan 240 of the claims table 100 to identify 250 any matching request identifier for the claim request.

When a claims table update succeeds 260, a lock is obtained 270 on the relevant row of the claims table and a lock is obtained on the relevant part of the HADB (for example, locking a database row or page 140 on a specified server)—as shown schematically in FIG. 4 in which an HADB manager 120 obtains a page lock. Both locks are implemented using the standard mechanisms available within the HADB. Successful updating of the claims table 100 is a pre-requisite to the database manager 120 updating the business data 90 within the HADB and only one message dispatcher 24 can update the claims table for each request. Updating of the business data 90 can only occur when there are no conflicting locks within the HADB. This ensures once-only updating of the HADB business data for each replicated request, despite the k-way replication of update requests and despite each of the queue data, the message dispatcher and business logic being implemented outside the high availability system of the HADB.

As noted above, the identification of the relevant part of the HADB may be performed within the HADB itself or as a function of the message dispatcher—in either case using conventional data access mechanisms. Write access to the locked part 140 of the HADB is now reserved for the business logic 34 associated with the current message dispatcher 24 (and in some implementations the lock reserves exclusive read access as well). The business logic 34 within the message dispatcher 24 is executed to process 350 the request and to determine any required updates to the HADB. The determined updates are then applied 360 to the HADB business data 90.

For example, the business logic may process a message that specifies an order for goods or services, updating a database of orders. Another example request may be a request for retrieval of status information relating to an existing order, perhaps checking progress on the preparation or delivery of a product. Many other business applications may be implemented using the present invention.

If the processing 350,360 of a request is successful 370, all changes to the HADB (including the claims table entry and business data updates) are committed 380. Commit of the HADB transaction is then confirmed to the message dispatcher system, which then deletes 320 the processed message.

Despite commit of the message transaction by one successful message dispatcher, replicas of the message may remain for a period on input queues 80,82,86 of other ones of the k message dispatchers 20,22,26. Each remaining replica of the message now has an implicit status of committed, and merely awaits deletion from its respective queue.

When the processing of a request has been committed 390, following successful processing 350,360 of the request, any new attempts to insert a claim in the claims table for another replica of the same request will be rejected. In this case, the comparison between a request message's unique request identifier and the set of request identifiers in the claims table will identify a match, and the matching request now has a "committed" status that is reflected by the unlocked claims table entry. That status is sufficient to confirm that the message should now be deleted from the input queue 80 of the respective message dispatcher 20 that is unsuccessfully attempting to add a duplicate entry into the claims table.

Other replicas of the message should also be deleted, although a definitive delete instruction for a committed request message does not require instantaneous deletion of all replicas. A committed HADB update is effective as a definitive instruction to commit the message retrieval (i.e. delete the message from the input queues of all message dispatchers) but the actual deletion for a particular input queue may be deferred until the corresponding message dispatcher attempts to enter a claim in the claims table.

The above-described saving of duplicate claim requests to memory while a first message processing is in progress (not yet committed), and rejecting duplicate claims requests and deleting the corresponding replica messages if the first message processing is successful, entails relatively little processing overhead and in particular minimizes expensive processing in the high availability system and HADB.

The successful processing and deletion of the winning replica does not involve expensive two phase commit operation between the HADB and the message store. If the message dispatcher should fail between the commit operation 380 and the delete message operation 320 for the winning replica message, the claims mechanism will prevent re-execution of the winning replica message in exactly the same way as it prevents execution for losing replicas. It will be appreciated that the mechanism to prevent re-execution of a single instance message is already known in the art (sometimes referred to as "one-and-a-half phase" commit).

As has been observed above, even in a system where this invention is used, the replicator 70 may choose not to take advantage of the invention for certain lower-value messages. It may be that these messages are tagged by the replicator as non-replicated, and handled in a special manner. In other embodiments, low value and non-urgent request messages are handled using the claim mechanism described above to achieve the benefit of one-and-a-half phase commit.

In an alternative embodiment, identification of a locked matching row of the claims table may trigger a reply to the respective message dispatcher with an explicit rejection of a claims request (instead of the above-described saving of claims requests to memory). This may occur where the database uses a 'presumed commit' locking strategy. This explicit rejection would leave the replica message on the respective message dispatcher's queue until a subsequent retry of the attempt to update the claims table, and this is likely to involve more processing than in embodiments in which requests to update a locked row of the claims table are temporarily saved to memory.

In either of the above-described embodiments, an attempt to update the claims table may be rejected while the processing of a first replica of the request message is still in progress (i.e. the processing is not yet complete and could still fail). Therefore, the message dispatcher holding a request message corresponding to a rejected claims request is able to subsequently retry updating the claims table, unless the message dispatcher has received an implicit instruction to delete the request (i.e. a claims table update failure report in response to a determination that a matching claims table entry is unlocked, since this implies that the message processing was successfully completed and committed). Such a subsequent retry may be performed following a predefined delay period, or the frequency of retries may depend on current system activity.

If a failure is experienced during the message processing, the HADB transaction must be aborted 400,410. In this situation, the claims table entry is deleted and the claims table row is unlocked 410. Depending on the nature of the failure, the message dispatcher may take various actions, including [a] leaving the replica message on the input queue for later reattempted processing, [b] moving the replica message to a dead letter queue, or [c] deleting the replica message and sending a failure notice to the original requestor. Alternatively, it may be the message dispatcher itself that fails, in which case the system will implicitly abort the HADB transaction (including removing the in-doubt claims table entry) and the replica message will remain on the input queue for subsequent retry. These examples of failure processing are known in the art.

A particular optimization is implemented in one embodiment of the invention to reduce HADB processing overheads. Where a new HADB transaction was started, but a claims table update was unsuccessful because a replica of a particular request had already been processed, the new HADB transaction is not terminated. Instead, a next request message is retrieved from the particular message dispatcher's input queue within the first HADB transaction. This is shown in FIG. 8. The message dispatcher then attempts to add a claims table entry (entering the request identifier in the table) for this next request message, and either succeeds or fails for one of the previously-described reasons. In this way, the transaction processing mechanisms that are involved in the achievement of once-only updating of the HADB are optimised to reduce the processing overhead (compared with solutions that are required to start and end a transaction for each attempt to add an entry to the claims table).

Table 1 in FIG. 9 represents some of the processing overheads (numbers of transactions and which resources are involved) for a number of alternative approaches to handling requests for services that require access to data within a HADB. A solution that is fully implemented within a high availability system, with the queue and business logic and HADB are all implemented in the same system, involves two transactions within the high availability system. The message insert transaction includes logging the data of the message, and may be coordinated with another high availability system resource. Both of these transactions involve significant overheads for high availability system resources. This is shown as solution (A) on the left hand side of Table 1.

A solution (B) that implements the queues and business logic outside of the high availability system avoids any queue management activity within the high availability system. However, a typical approach would not provide the desired assurance of once only message processing, for example because of the delayed orphan message problem mentioned above. Also the message processing transaction is likely to involve coordination between HADB resources and the external queuing system, which is more expensive than an internally-coordinated transaction. This solution (B) is represented in the middle columns of Table 1.

An embodiment of the present invention is represented as solution (C) on the right hand side of Table 1. This is likely to involve many more operations overall, and so is counter-intuitive, but most of these operations do not impact the high availability system. Only one transaction is necessary within the high availability system, and this transaction is coordinated with other data held in the same HADB and using the same claims manager 110 and HADB manager 120. Also, as the potentially large volume of data on the queue is not saved on the high availability system, this saves logging on the high availability system.

In the embodiments described in detail above, the message dispatchers and associated business logic do not have an awareness of the organisation of data within the HADB. In an alternative embodiment, either the message dispatchers or the associated business logic are implemented with an awareness of HADB segmentation and structure, and include routing/selection logic to ensure the most efficient path to the appropriate HADB segment. Such routing and selection logic is well known in the art. In such an embodiment, the claim manager can segment the claims table for greater affinity between application data segments and claims table segments.

In another example embodiment, messages are handled by each message dispatcher in batches for more efficient message handling. This batching increases the likelihood of two or more message processing components attempting to enter conflicting claims in the claims table, but the handling of conflicting claim attempts is a relatively low processing cost. In particular, the impact of conflicting claim attempts on the HADB is low. The operations performed by the message dispatcher according to this embodiment are represented below:

```
Loop on message batches
    Start message transaction
    [Loop on messages]
        Start HADB transaction
        Loop until claim succeeds
            Get message
            Attempt to insert claim in HADB claims table
            If claim attempt fails, loop to attempt claim of next message
        If claim succeeds, continue
        Perform business logic, updating HADB
        Commit HADB
    [loop to next message]
    commit message[s]
loop to next message batch
```

The embodiments described above include a mechanism whereby duplicates of a service request message are deleted, during normal processing, in response to failure of an attempt to insert an entry in the claims table. This mechanism may be augmented by further mechanisms. For example, a successful message dispatcher may notify other message dispatchers of its success, and the other message dispatchers may then delete their replicas of the message. Additionally, mechanisms may be provided for cleaning up the claims table, which must be accompanied by a clean-up of associated replicas of a successfully processed message from input queues of the message dispatchers.

Many messages do not require once-and-once-only processing. For example, messages requesting a simple read-only database query can be duplicated without sacrificing data integrity. The present invention mitigates problems associated with the cost of ensuring once-and-once-only execution of messages, but it may still be preferable to avoid the need for even this optimized once-and-once-only processing. As is known in the art, methods for avoiding unnecessary once-only processing include: explicit tagging of the required quality of service in the message, and the use of assumptions such as non-persistent messages need not incur the overhead of once-and-once-only processing. Some systems include explicit support, such as IBM Corporation's WebSphere MQ products in which one of the message get options is 'syncpoint if persistent'.

Various embodiments of the invention have been described above to provide a detailed illustration of how the invention may be implemented in different embodiments and to highlight some of the advantages of particular embodiments of the invention. The invention is not, however, limited to the particular exemplary embodiments described above and various modifications will occur to persons skilled in the art that are within the scope of the invention as set out in the attached claims.

The invention claimed is:

1. A method for managing service requests, for use in a data processing environment that includes a data store and at least one service requestor, the method comprising the steps:
   replicating in a high availability database (HADB) that is distributed across a tightly integrated cluster of servers using redundant storage arrangements of a data processing environment including at least one computer system comprising at least one processor and fixed storage, a service request of a requestor to at least two of a plurality of request processing components, the plurality of request processing components each being located within a communication path between the requestor and the data store;
   claiming processing responsibility for the service request in a first request processing component by the first message dispatcher used to dispatch data access operations that result from executing business logic, the processing responsibility for the service request being claimed by inserting an entry in a claims table repository of service request identifiers identifying service requests for which a request processing component has claimed responsibility;
   detecting an attempt to insert a duplicate entry in the claims table by a different message dispatcher and in response to the attempt, determining that a matching claims table row is locked on behalf of the first message dispatcher and holding in memory the duplicate entry until the matching claims table row becomes unlocked; and
   processing by the first request processing component a corresponding replica of the claimed service request, including accessing data within the data store while concurrently preventing from processing the service request in the data processing environment, any other request processing component that has not claimed processing responsibility based upon entries in the claims table for the service request.

2. The method according to claim 1, wherein the step of claiming processing responsibility comprises a step of entering an identifier for the service request in a repository in the data store, and wherein the method further comprises preventing any of the plurality of request processing components from entering a duplicate identifier for the service request in the repository.

3. The method according to claim 1, wherein the data processing environment comprises a plurality of distributed service requestors and the data store comprises a database running on the HADB.

4. The method according to claim 1, wherein the executing business logic comprises logic for requesting updates to data within the data store in response to a service request, and wherein the step of preventing any request processing component from processing the service request comprises a step of preventing execution of the respective request processing component's business logic.

5. The method according to claim 1, wherein complete processing of the service request requires updating of data within the data store, and wherein the step of preventing processing of the service request comprises preventing a completed processing by preventing updating of data within the data store.

6. The method according to claim 5, wherein the step of preventing processing of the service request comprises preventing a completed processing by preventing both read and write access to data within the data store.

7. The method according to claim 2, wherein the request processing components are messaging systems, and wherein the replicated service requests are messages enqueued on input queues of at least two of the messaging systems, and wherein the step of entering an identifier is performed on behalf of a first messaging system in response to a successful retrieval of a message from an input queue of the first messaging system.

8. The method according to claim 2, wherein the request processing components are messaging systems, and wherein the replicated service requests are messages enqueued on input queues of at least two of the messaging systems, and wherein the step of preventing any of the plurality of request processing components from entering a duplicate identifier comprises preventing a message retrieve operation from retrieving any messages for previously claimed service requests.

9. The method according to claim 2, wherein the step of entering an identifier includes the step of locking said identifier until the step of processing the replica service request is complete, and wherein the step of preventing any request processing component entering a duplicate identifier in the repository includes examining said lock and deferring or rejecting an attempt to enter an identifier until the lock is released.

10. The method according to claim 9, wherein identification of an unlocked identifier within the repository is recognized as a confirmation that the identified service request has been processed, and any request processing component attempting to enter a duplicate identifier in the repository responds to the unlocked identifier by deleting the respective request processing component's replica of the service request.

11. The method according to claim 1, wherein the repository is a database table in which each table row includes a single service request identifier corresponding to a claim to responsibility for the identified service request.

12. The method according to claim 11, wherein the data store is a database that includes said database table, and wherein an effect of successful processing of the replica of the claimed service request is an update to the data store, and wherein the successful processing includes a single phase commit of the steps of processing the request and updating the data store.

13. The method according to claim 1, wherein the replicating of a requestor's service request comprises time-separating the replicas of the service request.

14. A data processing system comprising:
a computer system comprising at least one processor an operating system and storage;
a data store coupled to the computer system the data store comprising a high availability database (HADB) that is distributed across a tightly integrated cluster of servers using redundant storage arrangements;
a plurality of request processing components comprising business logic, wherein each of the plurality of request processing components is located within a communication path between at least one service requestor and the data store;
different message dispatchers used to dispatch data access operations that result from execution of the business logic of the request processing components;
a replicator for replicating a service request of a service requestor to at least two of the plurality of request processing components; and
a claims manager executing in the computer system comprising: program code comprising programmatic functions arranged for claiming processing responsibility for the service request on behalf of a first one of the message dispatchers by inserting an entry in a claims table repository of service request identifiers identifying service requests for which a request processing component has claimed processing responsibility for processing;
program code comprising programmatic functions arranged for detecting an attempt to insert a duplicate entry in the claims table by a different one of the message dispatchers and in response to the attempt, determining that a matching claims table row is locked on behalf of the first one of the message dispatchers and holding in memory the duplicate entry until the matching claims table row becomes unlocked; and,
program code comprising programmatic functions arranged for processing by the first request processing component a corresponding replica of the claimed service request, including accessing data within the data store while concurrently preventing any other request processing component that has not claimed processing responsibility for the service request from processing the request based upon entries in the claims table.

15. The data processing apparatus according to claim 14, wherein the functions for claiming processing responsibility comprise functions for inserting an identifier of the service request within a repository of the data store, and wherein the claims manager further comprises functions for preventing any of the plurality of request processing components from entering a duplicate service request identifier within the repository.

16. A method comprising:
inserting replicated messaging and business logic on a data communication path between a plurality of requestors and a high availability data store (HADB), with the messaging and business logic defining a plurality of queues, and with each queue of the plurality of queues being respectively associated with a replica message dispatcher and associated business logic;
receiving, by the messaging and business logic, a plurality of messages from the plurality of requestors;
replicating, by the messaging and business logic, a first message of the plurality of messages across a first queue and a second queue of the plurality of queues;
receiving, by the HADB and from the first queue, the first message;
responsive to the receipt of the first message from the first queue, determining that a first message identification code, indicative of an identity of the first message, is not present in a machine readable table;
responsive to the determination that the first message identification code is not present in the machine readable table, obtaining a row-specific lock in the machine readable table and not a less granular lock on an entirety of the machine readable table, and writing, by the HADB and into the machine readable table, the first message identification code;
further responsive to the determination that the first message identification code is not present in the machine readable table, performing once-only servicing on the HADB as indicated by the first message;
subsequent to the receipt of the first message by the HADB from the first queue, receiving, by the HADB and from the second queue, the first message;
responsive to the receipt of the first message from the second queue, determining that the first message identification code is present in a machine readable table;
responsive to the determination that the first message identification code is present in the machine readable table, deleting, by the HADB, the first message received from the second queue.

* * * * *